Oct. 20, 1942.   S. P. JOHNSON   2,299,327
MEANS FOR DESTROYING AIRCRAFT
Filed Oct. 8, 1940   2 Sheets-Sheet 1

Inventor
Sidney P. Johnson

By Clarence A. O'Brien

Attorney

Oct. 20, 1942.  S. P. JOHNSON  2,299,327
MEANS FOR DESTROYING AIRCRAFT
Filed Oct. 8, 1940  2 Sheets-Sheet 2

Inventor
Sidney P. Johnson

By Clarence A. O'Brien

Attorney

Patented Oct. 20, 1942

2,299,327

UNITED STATES PATENT OFFICE 2,299,327

MEANS FOR DESTROYING AIRCRAFT

Sidney P. Johnson, Birmingham, Ala.

Application October 8, 1940, Serial No. 360,319

1 Claim. (Cl. 89—1)

The present invention relates to new and useful improvements in means for destroying aircraft and has for its primary object to provide, in a manner as hereinafter set forth, a flexible member or strand to be carried by and suspended from an aircraft in flight and which, upon contacting an opposing aircraft, is adapted to cut thereinto for destroying or crippling same.

Another very important object of the invention is to provide a means for destroying aircraft comprising one or more contact bombs for further assuring destruction of an aircraft with which the device comes in contact.

Other objects of the invention are to provide a means for destroying aircraft which will be comparatively simple in construction, reliable in use and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein.

Figure 1:
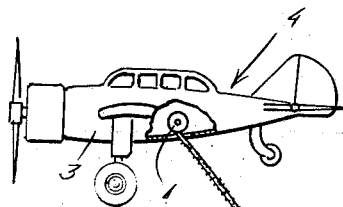
Figure 1 is a view in side elevation, showing an airplane in flight and equipped with a device constructed in accordance with the present invention, a portion of the fuselage of the airplane being broken away in section.
Figure 2:
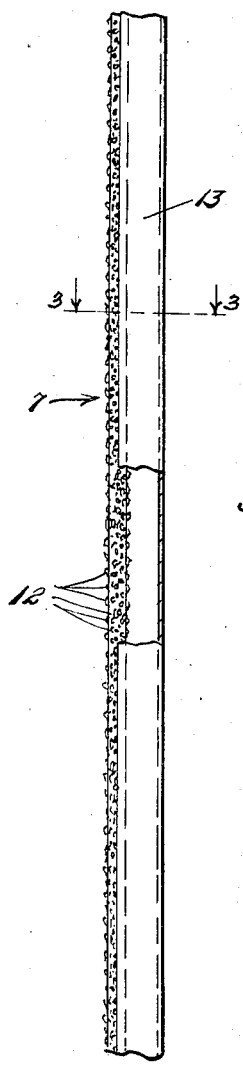
Figure 2 is a view in side elevation of a portion of the flexible cutter, showing a part thereof broken away in section.

Referring now to the drawings in detail, it will be seen that the reference numeral 1 designates a reel which is rotatably mounted on yieldable supports 2 in the fuselage 3 of an airplane which is designated generally by the reference numeral 4. It may be well to here state that the yieldable supports 2 constitute shock absorbers the purpose of which will be presently set forth. Suitable means, such as a crank 5, is provided for rotating the reel 1. A spring pressed friction brake 6 prevents idle rotation of the reel 1.

The reference numeral 7 designates generally a flexible cutter having one end connected to the reel 1 for winding thereon. The flexible cutter 7 passes through an opening 8 which is provided therefor in the bottom of the airplane fuselage 3. The flexible cutter 7 comprises a strand 9 of suitable wire or cable which, as best seen in Figure 1 of the drawings, is tapered toward its loose or free end. Mounted in any suitable manner on the flexible strand 9 at spaced points are contact bombs 10.

The strand 9 has applied thereto a coating of flexible adhesive 11. Embedded in the adhesive 11 are cutting or abrasive particles 12. The particles 12 include flint and high carbon steel for producing sparks when the flexible cutter 7 is drawn across an enemy aircraft. Extending rearwardly from the strand 9 is a streamlined tail or stabilizer 13.

Figure 6:
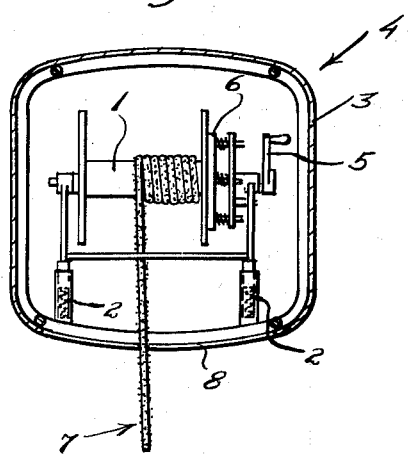
Figure 6 is a cross sectional view through the fuselage, taken substantially on the line 6—6 of Figure 5.

It is thought that the manner in which the invention functions will be readily apparent from a consideration of the foregoing. Briefly, when the airplane takes off and has gained the desired altitude, the flexible cutter 7 may be lowered therefrom. When an enemy craft is attacked it is done from a higher altitude and preferably while travelling in the opposite direction. When the flexible cutter 7 contacts the opposing aircraft and is drawn rapidly thereacross the particles 12 cut thereinto in a manner to destroy or cripple same. The particles 12 also produce sparks for possibly igniting the fuel of the craft to be destroyed. Should one of the contact bombs 10 engage the opposing craft substantially complete destruction thereof in the air is assured. The shock absorbers 2 prevent too much shock from being transmitted to the fuselage 3 when the cutter 7 strikes an opposing aircraft. As shown in Figure 6 of the drawings, a portion of the flexible cutter 7 is left wound on the reel 1. The friction brake 6 permits this to be done. When the cutter 7 strikes an opposing aircraft the friction brake 6 permits the reel 1 to rotate for paying out a little more of the strand 7, thus further reducing shock.

Figure 3:
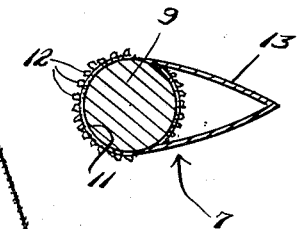
Figure 3 is a sectional view, taken substantially on the line 3—3 of Figure 2.
Figure 4:
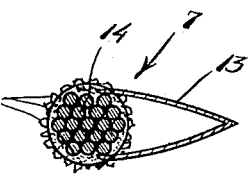
Figure 4 is a cross sectional view through a flexible cutter comprising a cable of the type which includes a plurality of strands.
Figure 5:
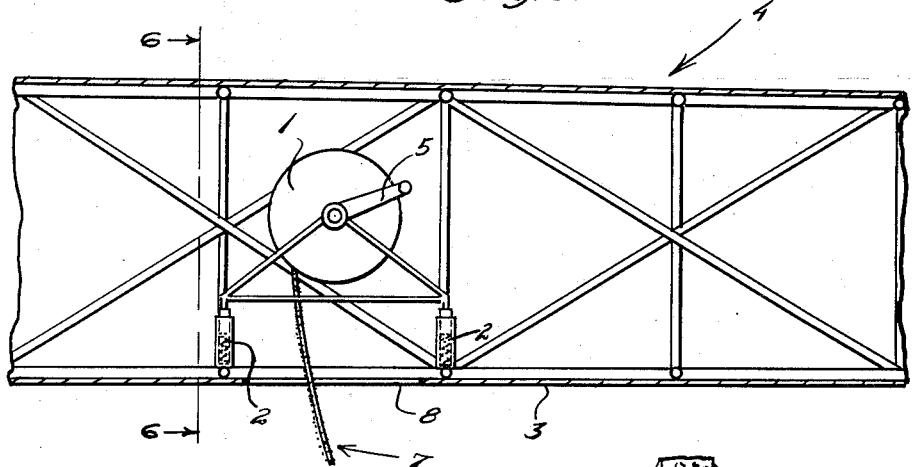
Figure 5 is a view in vertical longitudinal section through a portion of the airplane fuselage, showing the reel for the flexible cutter mounted therein.
Figure 7:
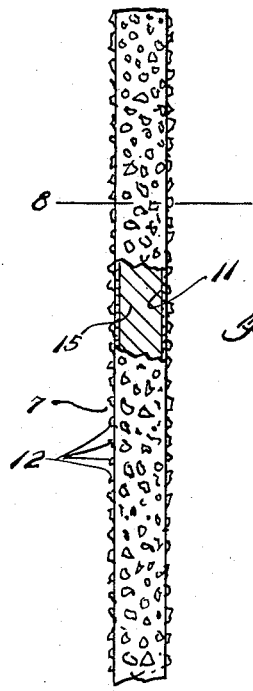
Figure 7 is a view in front elevation of a portion of another form of flexible cutter, a part thereof being broken away in section.
Figure 8:
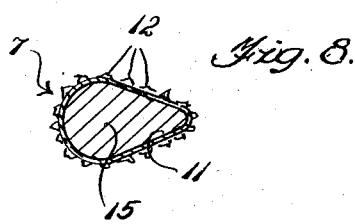
Figure 8 is a sectional view, taken substantially on the line 8—8 of Figure 7.

In Figure 4 of the drawings, the reference numeral 14 designates a flexible strand of the type comprising a multiplicity of wires. In other respects, this embodiment is substantially similar to that shown in Figure 3. In the modification illustrated in Figures 7 and 8 of the drawings, the reference numeral 15 designates a flexible strand of wire which is substantially ovate in cross section. Thus, the tail or stabilizer 13 of the embodiments shown in Figures 3 and 4 is eliminated.

It is believed that the many advantages of an aircraft destroying means constructed in accordance with the present invention will be readily understood and although preferred embodiments of the apparatus are as illustrated and described, it is to be understood that further modifications and changes in the details of construction may be resorted to which will fall within the scope of the invention as claimed.

What is claimed is:

A device for suspension from a reel in an aircraft to depend below said craft comprising a cable having one end adapted to be connected with the reel and the cable adapted when partly unwound from the reel to engage another aircraft to damage the same, said cable having a rounded front edge and converging side edges which form a sharp rear edge, the converging side parts preventing twisting of the cable when suspended from the reel and a coating of particles of abrasive material on the cable for increasing the cutting action of the cable cn the aircraft engaged thereby.

SIDNEY P. JOHNSON.